United States Patent [19]

Nelen

[11] Patent Number: 4,548,396
[45] Date of Patent: Oct. 22, 1985

[54] OBJECT-HOLDING DEVICE OF SUCKER CUP TYPE AND SHEET DISPENSING APPARATUS INCORPORATING SUCH DEVICE

[75] Inventor: Petrus R. Nelen, Essen, Belgium

[73] Assignee: Agfa-Gevaert N.V., Mortsel, Belgium

[21] Appl. No.: 498,158

[22] Filed: May 25, 1983

[30] Foreign Application Priority Data

May 26, 1982 [GB] United Kingdom ............... 8215349

[51] Int. Cl.[4] .................... B65G 59/04; B65H 3/08; B65H 3/42
[52] U.S. Cl. ................................ 271/90; 271/108; 294/64.1; 414/121
[58] Field of Search ............... 271/90, 91, 92, 93, 271/97, 98, 99, 100, 101, 102, 107, 108, 20, 11, 14, 12, 13, 15, 16; 294/64 R; 414/121; 221/211

[56] References Cited

U.S. PATENT DOCUMENTS

1,400,573 12/1921 Stader ............................ 294/64.1
3,834,558 9/1974 Bru ................................. 414/121

FOREIGN PATENT DOCUMENTS

740355 11/1932 France .............................. 271/90
1173422 12/1969 United Kingdom ............. 221/211

Primary Examiner—Bruce H. Stoner, Jr.
Assistant Examiner—James E. Barlow
Attorney, Agent, or Firm—William J. Daniel

[57] ABSTRACT

An object-holding device is described wherein a cup component comprising an elastically deformable sucker cup and an associated air vent passage communicating with the cup interior is urged by spring means into a position in which the end of such passage remote from the sucker cup is closed off by a selaing element on a supporting body in which the cup component is mounted for limited axial movement. For releasing an object held by the cup after the latter is pressed against the object, the body and cup component have merely to be relatively displaced against the spring bias to unseal the vent passage.

7 Claims, 3 Drawing Figures

OBJECT-HOLDING DEVICE OF SUCKER CUP TYPE AND SHEET DISPENSING APPARATUS INCORPORATING SUCH DEVICE

There are various known designs of object holding devices using sucker cups. The holding action of such cups depends upon the expulsion or exhaustion of air from within the cup while it is in contact with a surface of the object to be held.

Such holding devices are extensively used in sheet dispensers for the purpose of sequentially transferring sheets from one place to another, e.g. from a sheet stack holder to a position from or at which the sheets are handled or treated automatically by other means. Such dispensers are used for example in printing machines and document copying machines.

Prior art holding devices of sucker-cup type require to be coupled to a power source for controlling the suction effect. In some devices the sucker cup is connected to a vacuum source or an aspirator the action of which has to be controlled for causing an object to become held or released at an appropriate time. Another known device incorporates a flexible sucker cup which becomes deformed when pressed against an object to be held, with the result that air is expelled from within the cup, and incorporates a solenoid-controlled valve by which the interior of the cup can be placed in communication with atmosphere to cause release of the held object (see French Patent 2 105 164).

The necessity to provide a power source and associated switch or valve means is a disadvantage from the standpoints of convenience and cost. Particular problems are encountered when attempting to design a sheet dispensing apparatus incorporating a plurality of such holding devices suitably distributed for taking up sheets from a stack of sheets of different sizes. When a sheet to be picked up lies on a larger sheet, the cup or cups moving against the exposed part of the underlying sheet must be independently power controlled so that such underlying sheet is not taken up together with the top one.

It is an object of the present invention to provide an object holding device of sucker-cup type which does not require coupling to a power source for controlling the suction effect.

An object holding device according to the invention is characterised by the provision of a sucker cup component comprising the sucker cup and an air vent passage, such component being elastically biased, e.g. by a mechanical spring, towards a retracted position in relation to a body by which the component is supported, in which retracted position the end of the vent passage remote from the sucker cup is closed off by a sealing portion on the supporting body for the cup component.

By this combination of features the need for an extraneous power source for controlling the suction effect is avoided. For taking hold of a sheet or other object the device has merely to be pressed against the object to cause deformation of and expulsion of air from within the cup. In order to release the object it is merely necessary to displace the cup component against the biasing force of the spring and thereby separate the vent passage from sealing relationship with the sealing portion on the supporting body. For effecting this displacement, force can be exerted directly on the sucker cup or on the object held thereby.

The sealing portion is preferably an elastically deformable element fitted into or onto a rigid part of the body which supports the cup component.

In one embodiment of the invention, the vent passage is formed by a tube which is connected to the sucker cup and is axially slidable in supporting body. This is a simple way of mounting the cup component and providing the required vent passage.

In another embodiment of the invention the cup component comprises a stem on which the sucker cup is mounted and which is axially slidable in the aforesaid supporting body, and also comprises a collar which surrounds the stem; and the end of the vent passage remote from the sucker cup is in a surface of such collar, which surface is pressed against the sealing portion by the biasing means. This combination of features also favours a simple construction, and enables the co-operating sealing faces to be easily accessible for cleaning.

The invention also includes a sheet dispensing apparatus incorporating a holding device according to the invention as above defined. Such an apparatus incorporates hold-releasing means which at the sheet release stage of an operating cycle causes the cup component to project relative to its supporting body, thereby placing the interior of the sucker cup in communication with atmosphere via the vent passage. The apparatus can incorporate a plurality of holding devices according to the invention, mounted for bodily movement in unison.

In a preferred embodiment the hold-releasing means comprises at least one oscillating bar located so as, at the appropriate stage of the dispensing cycle, to bear against a sheet held by the sucker cup. Actuation of such oscillating bar may occur as a function of time in a dispensing cycle or in dependence on the spatial position acquired by the sheet in course of being dispensed.

A sheet dispensing apparatus according to the invention is very advantageous for use in dispensing metal, e.g. aluminium, printing plates or printing plate blanks of different sizes, for example printing plates produced by electrophotographic offset platemakers.

Certain embodiments of the invention, selected by way of example, will now be described with reference to the accompanying drawings, in which.

Figures 1, 2:
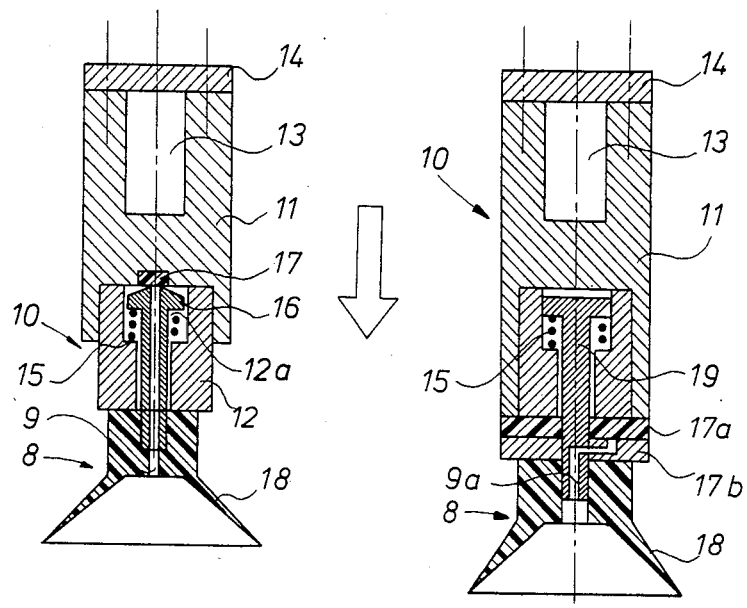
FIG. 1 shows one form of holding device according to the invention.
FIG. 2 shows another form of holding device according to the invention.

The holding device shown in FIG. 1 comprises a supporting body 10 which includes cylindrical members 11 and 12 arranged in fixed partially telescoping relation. Member 11 is provided with a transverse rectangular section recess 13 for the purpose of mounting the device on a carrier bar (not shown) when the device is installed in a sheet dispensing apparatus. A cover member 14 is releasably secured to the member 11 e.g. by screws, so that it can be removed to permit the holding device to be easily removed from the bar.

The member 12 has a central bore of which an upper part 12a is of larger diameter than the other part of the bore. The upper part 12a accommodates a biasing means in the form of a helical spring 15.

A cup component 8, comprising an elastically deformable sucker cup 18 and an axially extending hollow tube 16, is fitted to the supporting body 10 so that the cup component is axially displaceable relative to such body. The tube 16, to which the sucker cup 18 is secured at one end, is slidable in the bore of the body member 12. The tube has an enlarged head portion which is accommodated in the wider upper part 12a of that bore and provides a bearing flange for one end of the spring 15. The spring 15 exerts an upward force on the cup component 8 to retract the latter relative to member 11 and thereby hold the upper end of tube 16 against a sealing element 17 of elastically deformable material which is fitted into a recess in the member 11. In this retracted position of the cup component 8 the sealing element therefore seals off the upper end of the vent passage 9 extending through the interior of the tube 16 and on through the hub portion of the sucker cup 18.

In order to take hold of a sheet lying on a support, the illustrated device has merely to be pressed downwardly onto the sheet. This causes deformation of the sucker cup 18 and consequent expulsion of air from its interior, the air escaping between the cup and the sheet, leaving the sheet firmly held by the cup. When it is required to release the sheet it is merely necessary to cause relative axial movement of the body 10 and cup component 8 against the biasing force of spring 15. This can be done e.g. by raising the body 10 while restraining pressure is exerted on the sheet held by the cup, or by moving the cup 18 in a direction away from the body 10 while the latter is held stationary. Such movement can be effected by applying pressure against an object held by the cup, or directly against the cup itself or an attached part, e.g. a collar (if provided). The consequential separation of the sealing element 17 from the upper end of tube 16 places the vent passage 9 in communication with atmosphere in the widened bore 12a and the hold of the sucker cup on the sheet is therefore released.

In FIG. 2 the same reference numerals are used as in FIG. 1 to designate corresponding parts. The device shown in FIG. 2 differs from the FIG. 1 device in that the sucker cup 18 is mounted on a solid stem 19 in the lower end portion of which a portion of the vent passage 9a is formed. The stem is surrounded by a collar 17b in which an adjoining portion of such vent passage is formed. The upper extremity of the vent passage exits through the upper face of the collar 17b. The supporting body 10 is provided at its bottom end with a sealing element 17a of elastically deformable material and the collar 17b is normally held pressed against this sealing element by the force exerted by the spring 15.

Figure 3:
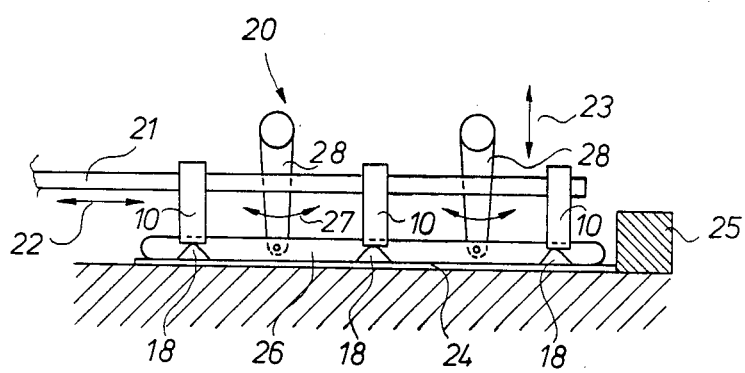
FIG. 3 shows part of a sheet dispensing apparatus incorporating holding devices according to the invention.

The sheet dispensing apparatus 20 represented in FIG. 3 comprises a plurality of holding devices according to the invention having their supporting bodies 10 mounted on a carrier bar 21. The bar 21 is connectred to a mechanism (not shown) by which the bar can be moved to and fro as indicated by arrow 22, and up and down as indicated by arrow 23. Such movements are arranged to displace the holding devices through an operating cycle for the purpose of transferring sheets one by one from a pick-up station to a delivery point represented by an aligning bar 25, ready for further handling or treatment in a particular way. When a sheet such as 24 has been brought by the holding devices to the delivery point, the thus-held sheet has to be released. For this purpose the apparatus includes an oscillating bar 26 to which an oscillating motion as indicated by the arrows 27 can be imparted by pivoting arms 28. When the bar 26 is at the lowest point of its trajectory it bears against the sheet 24 and while the oscillating bar 26 is in that position, the carrier bar 21 is raised. Because the cup components are restrained from upward movement by their hold on the sheet 24, the upward movement of the carrier bar 21 carries the supporting bodies 10 upward relatively to the cup components, breaking the seal of the vent passages and in consequence the interiors of the cups 18 are placed in communication with atmosphere via the vent passages.

I claim:

1. Sheet dispensing apparatus comprising at least one sheet holding device of the flexible sucker-cup type comprising a cup component including a flexible sucker cup which when pressed against an object to be held becomes deformed with consequential expulsion of air from within the cup and gripping of the object by the cup, and a vent passage communicating between the interior of the cup and the exterior atmosphere, a supporting body upon which said cup component is mounted for projection and retraction relative to said body, biasing means urging said cup component into its retracted position on said supporting body, and a sealing member carried by said body for sealing engagement with the exterior opening of said vent passage when said cup component is in its retracted position, whereby relative displacement of said component and body from said retracted position breaks the vent passage seal to admit air of the cup interior to release said object; a carriage carrying such supporting body for bodily displacement repetitively through an operating cycle for gripping at least one sheet at a pick-up station, advancing such sheet holding device with the attached sheet from that station to another station at which the sheet is released, and subsequently returning to said pick-up station for gripping another sheet; and sheet releasing means operative at the sheet release station of said cycle to cause projected movement of the cup component from its retracted position relative to said supporting body against the action of said biasing means thereby to open said vent passage to atmospheric air and effect release of the gripped sheet.

2. Apparatus according to claim 1, wherein said cup component includes a stem integral with said sucker cup and said vent passage is constituted at least partially by a bore in said stem.

3. Apparatus according to claim 2, wherein said stem encloses a portion of said vent passage communicating with said cup interior, and further comprising a collar which surrounds said stem and carries an exterior portion of said passage, said exterior portion of said vent passage having an end opening in a surface of such collar, said collar surfaces and said passage end opening being pressed against said sealing member by said biasing means when said cup component is in said relatively retracted position.

4. A device according to claim 1, wherein said sealing member is constituted by an elastically deformable pad fitted onto a rigid part of said supporting body.

5. A device according to claim 1, wherein said biasing means is a spring.

6. Sheet dispensing apparatus according to claim 1, wherein said releasing means comprises at least one oscillating bar for pressing in one direction against a sheet gripped by said sucker cup while said carriage is held against movement in that direction.

7. Sheet dispensing apparatus according to claim 1, wherein said releasing means effects said relative projected movement of the cup component by preventing movement of a sheet gripped by the sucker cup while said carriage is positively displaced away from said sheet.

* * * * *